A. T. BROOKS & W. T. MUNGER.
Lock.
No. 211,832. Patented Feb. 4, 1879.
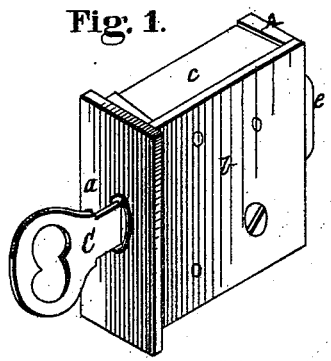
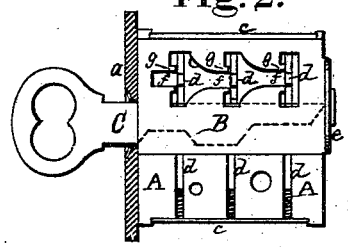
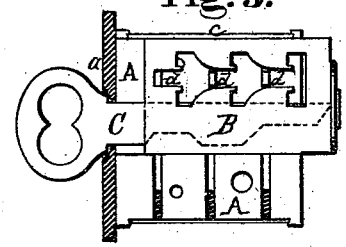
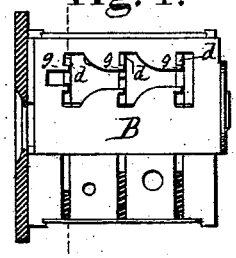
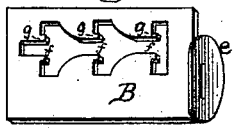
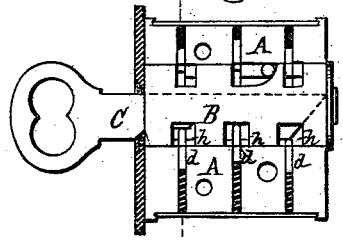
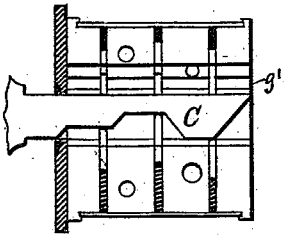
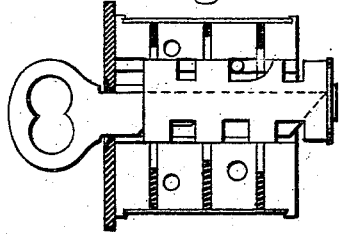
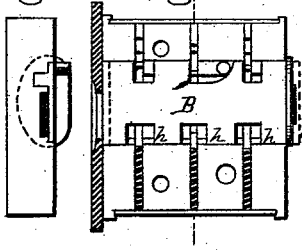
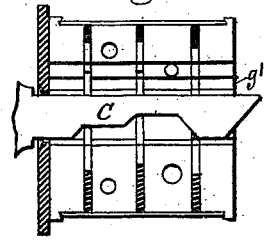
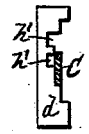
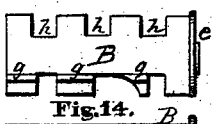
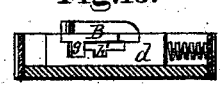
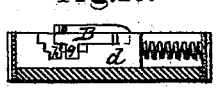
WITNESSES. INVENTOR.

UNITED STATES PATENT OFFICE.

ASA T. BROOKS AND WALLACE T. MUNGER, OF NEW BRITAIN, CONNECTICUT, ASSIGNORS TO THE RUSSELL & ERWIN MANUFACTURING COMPANY, OF SAME PLACE.

IMPROVEMENT IN LOCKS.

Specification forming part of Letters Patent No. 211,832, dated February 4, 1879; application filed May 9, 1878.

*To all whom it may concern:*

Be it known that we, ASA T. BROOKS and WALLACE T. MUNGER, both of New Britain, in the county of Hartford and State of Connecticut, have invented certain new and useful Improvements in Locks; and we do hereby declare that the following specification, taken in connection with the drawings furnished and forming a part of the same, is a clear, true, and complete description thereof.

Our said improvements relate to such locks as embody sliding tumblers and a sliding bar, and have keys which on being partially inserted adjust or set the tumblers, and on being fully inserted impart to the sliding bar a longitudinal movement.

The object of our improvements is to render such locks more secure than heretofore against the release of the sliding bar through illicit tampering with the tumblers as in "lock-picking;" and our invention consists, mainly, in the combination, with the tumblers, of a sliding bar provided with safety-shoulders, which engage with and prevent the movement of one or more of the tumblers whenever the sliding bar is moved forward other than by its true key, or before all the tumblers have been properly adjusted and maintained in that position, as is accomplished by the true key. These safety-shoulders may be located at various points on the sliding bar; and although we do not limit the main feature of our invention to any particular construction of the safety-shoulders, or to any particular location thereof on said bar, we find that good and highly satisfactory results are attained if the bar be provided with a series of longitudinal gatings, and each of said gatings be provided with a safety-shoulder, and this particular construction constitutes another feature of our invention.

To more particularly describe our improvements, we will refer to the accompanying drawings, in which—

Figure 1 represents, in front perspective, a lock embodying our invention. Figs. 2 to 4, inclusive, illustrate the interior of a lock with the several parts thereof in varied positions. Fig. 5 is a sectional view on dotted line, Fig. 4. Fig. 6 is a side view of a sliding bar detached. Figs. 7 to 11 are interior views of a lock slightly differing in construction from that previously shown, but embodying our invention. Fig. 12 is a front-end view of a lock with face-plate detached. Fig. 13 is a side view of a tumbler from the lock Fig. 7, with section of key engaged therewith. Fig. 14 contains a side and edge view of the sliding bar detached from lock Fig. 7. Figs. 15 and 16 are sections through dotted lines in Figs. 7 and 11, respectively.

The lock illustrated in Figs. 2 to 6, inclusive, will be first described.

The body of the lock A, cast in one piece, the face-plate $a$, side plate, $b$, and end pieces, $c$, occupying recesses in the body of the lock, and secured therein by the side plate, are all as heretofore constructed. The sliding bar B, aside from the safety-shoulders $g$ and the longitudinal gatings $f$, Figs. 2 to 6, is substantially as heretofore, and the same is true of the tumblers $d$, except so far as relates to their particular form and the location of their key-seats, these being varied widely in this class of locks. The key C, on being partially-inserted, releases the tumblers from the bar, and places them in line with the gatings $f$, longitudinally arranged in the bar, and the continued end-thrust of the key imparts a corresponding movement to the bar, the head $e$ of which is relied upon for the performance of useful work in controlling bolts, latches, &c., to which our present invention does not relate. The sliding bar is shown in its normal position in Fig. 2; but the key is partially inserted, so as to bring the working portion of the tumblers $d$ opposite the gatings $f$, and in Fig. 3 said bar is shown in its advanced position, due to the end-thrust on the key. The sliding bar is capable of a slight endwise movement before coming in contact with the tumblers, and the object of our invention is to prevent the tumblers from being illicitly set so as to release the sliding bar. If one tumbler be depressed by the "lock-pick," the sliding bar cannot, in our improved lock, be relied upon for holding it down pending operations upon succeeding tumblers, nor can the sliding bar be pushed forward with pressure on the tumblers, and thereby be made to reveal, by feeling, which one, if either, of the tumblers should be first depressed, because under either of these circumstances the tumblers will be rendered immovable. This is effected by the safety-shoulders $g$, which, in the lock, Figs. 2 to 6, are located above the gatings $f$. In Fig. 4 the first tumbler is shown to have been first adjusted opposite its gating, and the bar advanced so as to hold it; but this advance of the bar has placed the remaining shoulders $g$ across the path of their respective tumblers, and therefore neither of them can be moved. If the first tumbler were not depressed, and the bar advanced, as shown, then it also would have been rendered immovable in like manner. The tumblers $d$ for this form of bar are exceedingly simple, and one is shown in side view in Fig. 5, with its working portion opposite its gating, it being a sectional view on dotted line, Fig. 4.

The lock shown in Figs. 7 to 16 has a bar, B, which is more like those heretofore constructed. The tumblers are more complex than the others described, and one of them is shown in Fig. 13. The action of the key on the tumblers and bar is as before described. The front tumbler, as in lock shown in Fig. 3, limits the forward movement of the bar, while in Figs. 7 to 10 it is limited by a stud in the lock-body, which occupies an enlarged upper notch in the bar. The safety-shoulders $g$ on this form of bar are located on its rear side, and are shown in Figs. 14 to 16. This location of the shoulder necessitates a longitudinal groove, $g'$, in the body of the lock, Figs. 9 and 10, and also two recesses, $h'$, in the tumbler $d$. (See Figs. 13, 15, and 16.)

Referring to Fig. 11, it will be seen that the bar B, if moved as indicated in dotted lines, would abut against its tumblers; but when in this position our safety-shoulders render all the tumblers immovable.

It will be seen that the front sides of the upper notches in the bar are farther advanced thereon than the front sides of the opposite lower notches, $h$, which serve as gatings for the tumblers.

The safety-shoulders $g$, Fig. 14, have their front edges in line with the front sides of the upper notches, and, therefore, when the bar is advanced into contact with the tumblers in the lower notches, these shoulders are thereby so far advanced that they enter and occupy the lower recesses $h'$ of the adjacent tumblers, as in Fig. 16, and render them immovable. If one of the tumblers be accurately depressed by a lock-pick and the bar then advanced, the adjacent shoulder will enter the upper recess $h'$ in that tumbler, and the lower recess of each of the other tumblers will simultaneously be occupied, so that they will resist intrusion. When all the tumblers are adjusted by their true key and the bar is then advanced, these shoulders occupy the upper recesses of the tumblers. The bar, having been advanced by the key, must be thrown backward before the key can be withdrawn, because the tumblers are then immovable, and the key having no retractile power over the bar, a spring or other means is relied upon for inducing the backward movement.

We are aware that these safety-shoulders may be variously located on the bar, and that their form and their mode of engaging with the tumblers can be extensively varied, and we therefore do not limit ourselves to the precise construction and arrangement shown, although, of the two embodiments of our invention described, we prefer the longitudinal gatings $f$, with the safety-shoulders $g$ above said gatings. The corresponding shoulders below the gatings serve to block the tumblers in case they are unduly depressed and the bar advanced.

Having thus described our invention, we claim as new and desire to secure by Letters Patent—

1. The combination, with tumblers, of a sliding bar which is moved longitudinally by a key, and is provided with shoulders which render the tumblers immovable when the bar is advanced other than by its key, substantially as described.

2. The combination, with tumblers, of a sliding bar provided with longitudinal gatings, and shoulders at each gating, which obstruct the movement of the tumblers when the bar is advanced except by its key, substantially as described.

ASA T. BROOKS.
WALLACE T. MUNGER.

Witnesses:
HENRY E. RUSSELL, Jr.,
THEO. E. SMITH.